(12) United States Patent
Miki (10) Patent No.: US 11,033,861 B2
(45) Date of Patent: *Jun. 15, 2021

(54) POROUS MEMBRANE (71) Applicant: ASAHI KASEI KABUSHIKI KAISHA, Tokyo (JP)

(72) Inventor: Yuki Miki, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/210,338

(22) Filed: Dec. 5, 2018

(65) Prior Publication Data

US 2019/0168169 A1 Jun. 6, 2019

(30) Foreign Application Priority Data

Dec. 5, 2017 (JP) .............................. JP2017-233561

(51) Int. Cl.
*B01D 69/02* (2006.01)
*B01D 69/08* (2006.01)
*C02F 1/44* (2006.01)
*B01D 71/34* (2006.01)

(52) U.S. Cl.
CPC ........... *B01D 69/02* (2013.01); *B01D 69/081* (2013.01); *B01D 69/082* (2013.01); *B01D 71/34* (2013.01); *C02F 1/44* (2013.01); *C02F 1/441* (2013.01); *B01D 2325/02* (2013.01); *B01D 2325/022* (2013.01); *B01D 2325/04* (2013.01); *B01D 2325/20* (2013.01)

(58) Field of Classification Search
CPC .... B01D 69/02; B01D 69/081; B01D 69/082; B01D 71/34; B01D 2325/022; B01D 2325/02; B01D 2325/20; B01D 2325/04; B01D 69/08; B01D 63/02; C02F 1/441; C02F 1/44; C02F 2103/04
See application file for complete search history.

(56) References Cited

U.S. PATENT DOCUMENTS 6,165,363 A * 12/2000 Oishi .................... B01D 69/02
210/500.23
2016/0052804 A1 2/2016 Nosaka et al.

FOREIGN PATENT DOCUMENTS

WO 2014156644 A1 10/2014
WO 2017217446 A1 12/2017

* cited by examiner

*Primary Examiner* — Taiwo Oladapo
(74) *Attorney, Agent, or Firm* — Kenja IP Law PC (57) ABSTRACT

Provided is a porous membrane having a high blocking performance suited for filtration application as well as being excellent in water permeability performance, which is capable of providing stable filtering operation over a long period of time. The porous membrane has a cross-sectional pore size index of 40 or more in a region where a membrane thickness position ranges from 0.1 to 0.2 within the membrane thickness which is normalized by defining one surface position as 0 and the other surface position as 1 and divided into ten regions in the membrane thickness direction, the cross-sectional pore size index being calculated by: Cross-Sectional Pore Size Index=(Cross-Sectional Pore Size in the Range)/(Pore Size of the One Surface).

10 Claims, 3 Drawing Sheets

POROUS MEMBRANE

RELATED APPLICATION

This application is a continuation of Japanese Patent Application No. 2017-233561, filed Dec. 5, 2017, which is incorporated by reference in its entirety.

TECHNICAL FIELD

The present disclosure relates to a porous membrane.

BACKGROUND

Filtration processes have widely been used in the sectors of manufacturing sterile water, high purity water, or drinking water, and of air purification. In recent years, filtering processes have also been applied in a wider range of fields such as secondary treatment or tertiary treatment in sewage plants for treating domestic wastewater and industry drainage, as well as in the field of highly turbid water treatment such as solid-liquid separation in septic tanks.

A membrane module is employed for filters for use in such filtration processes, the membrane module being an assembly of hollow fiber membranes made of polymers having excellent workability which are formed in a hollow tube shape or flat membranes made of polymers formed in a sheet shape.

In particular, when clarifying river water for use as tap water, filters are required to have three performances: namely, high blocking performance; high water permeability for treating a large amount of water; and high strength for long time use in a wide range of operating conditions including high operating pressure.

Of the performances required for porous membranes for use in the aforementioned membrane module, blocking performance is important for reliably removing virus and germs. Also important is to provide high water permeability while maintaining the blocking performance.

WO2014/156644 (PTL 1) proposes a porous membrane in which a cross-sectional pore size is specified to thereby attain both virus removal rate and water permeability performance. However, such porous membrane has small cross-sectional pore size gradient in the vicinity of the surface, and thus low in water permeability performance.

CITATION LIST

Patent Literature

PTL 1: WO2014/156644
PTL 2: WO01/53213

SUMMARY

The disclosed porous membrane has high water permeability performance suited for filtering application as well as having high blocking performance.

We have made intensive studies to solve the aforementioned problem to conceive of the disclosed membrane.

The disclosed membrane is configured as follows.

[1] A porous membrane having a cross-sectional pore size index of 40 or more in a region where the membrane thickness position ranges from 0.1 to 0.2 within the membrane thickness which is normalized by defining one surface position as 0 and the other surface position as 1 and divided into ten regions in the membrane thickness direction, the cross-sectional pore size being calculated as Cross-Sectional Pore Size Index=(Cross-Sectional Pore Size in the Range)/(Pore Size in the One Surface).

[2] The porous membrane according to item [1], having a cross-sectional pore-size index of 25 or more in a region where the membrane thickness position ranges from 0 to 0.1.

[3] The porous membrane according to item [1] or [2], having a cross-sectional pore-size index of 70 or more in a region where the membrane thickness position ranges from 0.2 to 0.3.

[4] The porous membrane according to any one of items [1] to [3], which is formed of a single layer.

[5] The porous membrane according to any one of items [1] to [4], in which the one surface has an average pore size of 50 nm or less.

[6] The porous membrane according to any one of items [1] to [5], in which the porous membrane has a compression resistive strength of 0.40 MPa or more.

[7] The porous membrane according to any one of items [1] to [6], in which the pore size of the other surface is in the ratio of 50 or more to the pore size of the one surface.

[8] The porous membrane according to any one of items [1] to [7], in which the porous membrane has a cross-sectional pore size of 2.0 μm or more in a region where the membrane thickness position ranges from 0.6 to 0.9.

[9] The porous membrane according to any one of items [1] to [8], in which the porous membrane has a pure water permeability of 4000 LMH or more.

[10] The porous membrane according to any one of items [1] to [9], in which the porous membrane includes a vinylidene fluoride-based resin as a main component.

The disclosed porous membrane has high blocking performance as well as excellent water permeability performance suited for use in filtering application, which is capable of providing stable filtering operation over a long period of time.

DETAILED DESCRIPTION

Hereinafter, suitable embodiments of the disclosed membrane are described in detail.

The porous membrane of this embodiment has a cross-sectional pore size index of 40 or more. The cross-sectional pore size index is calculated, in a region where the membrane thickness position ranges from 0.1 to 0.2 within the membrane thickness which is normalized by defining one surface position as 0 and the other surface position as 1 and divided into ten regions in the membrane thickness direction, the cross-sectional pore size index being calculated by: Cross-Sectional Pore Size Index=(Cross-Sectional Pore Size in the Range)/(Pore Size in the One Surface).

The porous membrane of this embodiment includes, as a polymer component for forming the membrane, for example, a vinylidene fluoride-based resin, a hexafluoropropylene-based resin, or a polysulfone-based resin, as a main component. Here, "include . . . as a main component" means that the porous membrane includes 50 mass % or more of the resin in terms of solid content of the polymer component. The content of the aforementioned polymer component is preferably 60 mass % or more and more preferably 70 mass % or more.

Examples of the polysulfone-based resin may include polysulfone and polyethersulfone.

Herein below, the description is given of a vinylidene fluoride-based resin; however, the polymer component for forming the disclosed porous membrane is not limited thereto.

A vinylidene fluoride-based resin means a homopolymer of vinylidene fluoride or an interpolymer containing 50% or more of vinylidene fluoride in a molar ratio. The vinylidene fluoride-based resin may preferably be a homopolymer in terms of providing excellent strength. When the vinylidene fluoride-based resin is an interpolymer, other intermonomers to be copolymerized with the vinylidene fluoride monomer may selectively employ publicly-known monomers, and suitable examples thereof may include, for example, a fluorine-based monomer or a chloride-based monomer, without being particularly limited.

Here, the weight average molecular weight (Mw) of the vinylidene fluoride-based resin, which is not particularly limited, may preferably be 100,000 or more and 1,000,000 or less, and more preferably 150,000 or more and 900,000 or less. Further, without being limited to the vinylidene fluoride-based resin with a single molecular weight, a plurality of vinylidene fluoride-based resins with different molecular weights may also be mixed. In this embodiment, the weight average molecular weight (Mw) may be obtained by Gel Permeation Chromatography (GPC) using a known molecular weight of a standard resin as a reference.

Further, the porous membrane may preferably include, without being particularly limited, 80 mass % or more and 99.99 mass % or less of a vinylidene fluoride-based resin in the polymer component.

On the other hand, the porous membrane may include other polymer components. Preferred as the other polymer components, without being particularly limited, may be any resin mutually soluble with a vinylidene fluoride-based resin, and suitable examples thereof may include a fluorine-based resin which exhibits chemical resistance as high as that of a vinylidene fluoride-based resin.

Further, the disclosed porous membrane may preferably include a hydrophilic resin as other polymer components. Preferred examples of hydrophilic resins may include: polyethylene glycol (also referred to as polyethylene oxide) with a weight average molecular weight (Mw) of 20,000 or more and 300,000 or less or polyvinylpyrrolidone with K-value, as an index of molecular weight, of 17 or more and less than 120. In this embodiment, K-value may be obtained in accordance with JIS K7367-2.

The content of the aforementioned other polymer components may be 50 mass % or less, preferably 5 mass % or more and 40 mass % or less, and more preferably 7 mass % or more and 30 mass % or less.

The disclosed porous membrane may contain preferably 0.01 parts by mass or more and 4.0 parts by mass or less, desirably 0.01 parts by mass or more to 3.5 parts by mass or less, and further desirably 0.01 parts by mass or more to 3.0 parts by mass or less of polyethylene glycol, with respect to 100 parts by mass of the vinylidene fluoride-based resin. The porous membrane containing polyethylene glycol with the aforementioned content will make the membrane surface more hydrophilic, leading to easy formation of a water molecule layer on the membrane surface when the porous membrane is brought into contact with an aqueous solution. The water molecule layer thus formed on the membrane surface can be assumed to reduce contact frequency between the polymer component forming the porous membrane and washing chemicals, which leads to improve chemical resistance of the porous membrane.

Here, polyethylene glycol with the weight average molecular weight (Mw) of less than 20,000 tends to cause increased elusion from the membrane. On the contrary, when the weight average molecular weight (Mw) of polyethylene glycol exceeds 300,000, a porous media forming the porous membrane partially contains polyethylene glycol in spherical shapes, which tends to reduce the strength of the porous media.

On the other hand, when the content of polyethylene glycol is less than 0.01 parts by mass, a water molecule layer is less likely to be formed. When the content exceeds 4.0 parts by mass, polyethylene glycol excessively attracts water molecules to cause swelling of the membrane, which tends to reduce permeability. The content is preferably 0.1 parts by mass or more, and more preferably 0.3 parts by mass or more.

Polyethylene glycol may be contained in any other forms, without particularly limited to those described above. For example, polyethylene glycol may be contained through coating or graft polymerization so that polyethylene glycol molecules can only be found in the surface layer of the porous media. However, in terms of maintaining the effect of improving chemical resistance over a long period of time, at least part of the polyethylene glycol molecules may preferably be embedded in the skeleton of the porous media. Polyethylene glycol can be contained in any form to produce the effect of improving chemical resistance. However, when polyethylene glycol is applied through coating or the like to the surface layer of the porous media, polyethylene glycol elutes overtime when used in water. When polyethylene glycol is physically bound to the surface layer of the porous media through graft polymerization or the like, washing chemicals cut off the binding site during washing of the membrane. In either case, the effect of improving chemical resistance is less likely to be maintained over a long period of time.

The description has been given of an embodiment containing polyethylene glycol as a hydrophilic resin; however, the present disclosure is not particularly limited thereto.

Exemplary configuration of the aforementioned porous membrane may include, for example, a hollow fiber membrane structure.

The hollow fiber membrane herein refers to a membrane having a hollow circular configuration. The porous membrane having a hollow fiber membrane structure can increase a membrane area per module unit volume as compared to a flat membrane.

However, the porous membrane of this embodiment is not limited to the porous membrane having a hollow fiber membrane structure (hollow fiber porous membrane), and may be those with other membrane structures, such as a flat membrane or a tubular membrane.

In the field of water treatment, virus and bacteria need to be removed. The aforementioned porous membrane is disposed such that the aforementioned one surface may be used on the untreated water side, with the average pore size in the surface on the untreated water side being 50 nm or less, and the variation coefficient (=(Standard Deviation/Mean Value)×100) of the pore sizes on the surface being 10% or more and 50% or less, to thereby suppress reduction of water permeability performance while developing high blocking performance. Smaller variation coefficients indicate the pore size distribution being sharper. Sharper porous distribution limits the number of pores formed to have pore size larger than the average value, so as to suppress degradation of blocking performance, to thereby develop high blocking performance while suppressing reduction of water permeability without the need for unnecessarily reducing the pore size on the surface. Further, the variation coefficient of 10% or more readily allows for stable manufacture. The coefficient is desirably 10% or more and 45% or less, and more desirably 10% or more and 40% or less.

Here, the average pore size on the aforementioned one surface is preferably 5 nm or more and 50 nm or less, and further, the variation coefficient of pore size is more preferably 10% or more to 40% or less. The mean value of pore size in the aforementioned one surface is more preferably 5 nm or more and 40 nm or less, and the variation coefficient of pore size is further preferably 10% or more to 35% or less.

Further, the aforementioned porous membrane preferably has a three dimensional network structure. A three dimensional network structure allows for favorable pore interconnectivity between adjacent pores, providing smaller resistance to water passing through the porous membrane, which can develop high water permeability performance. The interconnectivity can be expressed by the ratio of the membrane thickness of the porous membrane to the pure water permeability. For example, in a structure where spherical crystals are connected or in an independent bubble structure which is poor in interconnectivity among pores, resistance increases in thick membrane portions, reducing the ratio to small. On the other hand, the ratio becomes larger in the three dimensional network structure. The interconnectivity is preferably 4000 LMH (L/m$^2$/hr) or more, and more preferably 4500 LMH or more, with respect to the pure water permeability which is defined as F.

The permeability coefficient may be defined as P, which may be expressed as P=F/D, where D is the membrane thickness of the porous membrane and P is defined by the ratio between the membrane thickness of the porous membrane and the pure water permeability. In this embodiment, the permeability coefficient P may be 5200 L/m$^2$/hr/mm or more so as to obtain a porous membrane with a three-dimensional network structure which has developed high water permeability performance. The permeability coefficient P is preferably 5800 L/m$^2$/hr/mm or more, and further preferably 6200 L/m$^2$/hr/mm or more. Further, the membrane thickness is preferably 150 μm or more, and further preferably 200 μm or more. The membrane thickness of 150 μm or more allows for maintaining the porous membrane structure against the filtration pressure.

When the aforementioned porous membrane has a hollow fiber membrane structure, an outside-in filtration mode is mainly employed so as to ensure large filtration area. Accordingly, the porous hollow fiber membrane is required to have high strength with respect to the external pressure direction, that is, high compression resistive strength, so that the hollow fiber membrane does not crush during filtration operation. The disclosed porous membrane can have a compression resistive strength of 0.40 MPa or higher. The porous membrane with the compression resistive strength of 0.40 MPa or more allows for keeping the shape thereof for a long time in the field of water treatment where the membrane is placed under operating pressure over a long period. The compression resistive strength is preferably 0.45 MPa.

In the porous membrane with the hollow fiber membrane structure, the inner diameter of the hollow portion of the hollow fiber membrane is preferably 0.10 mm or more and 5.0 mm or less and the outer diameter thereof is preferably 0.15 mm or more and 6.0 mm or less. More preferably, the inner diameter is 0.20 mm or more and 4.0 mm or less, and the outer diameter is 0.3 mm or more and 5.0 mm or less.

To measure the virus-blocking performance of the porous membrane, *E. coli* phage MS-2 may be used. As a test method, for example, indicator bacteria of predetermined size may be cultured and a virus concentrate is prepared in distilled water so as to contain the indicator bacteria at a concentration of about $1.0 \times 10^7$ pfu/mL, which is subjected to total filtration. The ratio of the bacteria concentration in the concentrate (numerator) to the bacteria concentration in the permeate (denominator) is represented by logarithmic reduction value (LRV). LRV in the porous membrane of this embodiment is preferably 1.5 or more, and more preferably 1.6 or more.

In order to further improve the water permeability performance, the porous membrane may be used such that one surface side with smaller pore size is disposed on the untreated water side, so that the pore size on the filtrate side is larger as compared to that on the untreated water side. This configuration can provide smaller resistance to the liquid passing in the membrane cross-sectional direction, to thereby increase the water permeability performance. Further, the pore size being smaller on the untreated water side is capable of suppressing clogging in the membrane cross-sectional direction due to membrane fouling substances.

The average pore size on the other surface may be three times or more larger than the average of the smaller pore size on one surface, which allows for developing high water permeability performance. The average pore size on the other surface is preferably 10 times or more and 700 times or less, and further preferably 50 times or more and 650 times or less, with the lower limit thereof being more preferably 100 times or more, and particularly preferably 150 times or more. The average pore size falling within this range allows for achieving high water permeability performance as well as developing high compression resistive strength.

Further, in the pore size profile in the membrane thickness direction, the position of the surface (one surface) on the untreated water side is defined as 0 and the position of the surface (the other surface) on the filtrate side is defined as 1 so as to divide the profile into 10 portions in the membrane thickness direction. In this case, the cross-sectional pore size may be 2.0 μm or more in a region where the membrane thickness position ranges from 0.6 to 0.9, so as to develop high water permeability performance. The cross-sectional pore size of 2.0 μm or more in the region of 0.6 to 0.9 can reduce resistance during filtration and prevent accumulation of substances in the membrane cross-sectional direction to thereby suppress reduction of water permeability performance, the substances otherwise leading to a major cause of membrane performance reduction. The cross-sectional pore size in this region is preferably 2.5 μm or more, and more preferably 3.0 μm or more.

The cross-sectional pore size index may be 40 or more in a region where the membrane thickness position ranges from 0.1 to 0.2 in a normalized profile divided into 10 portions in the membrane thickness direction, so as to develop further higher water permeability performance. Here, the cross-sectional pore size index is calculated by: Cross-Sectional Pore Size Index=(Cross-Sectional Pore Size in the Range)/ (Pore Size on the One Surface), so as to obtain the ratio between the cross-sectional pore size and the pore size on the surface (one surface) on the untreated water side. A sharp gradient structure in the vicinity of the surface on the untreated water side suppresses clogging of the pore portion in cross section even if membrane fouling substances are captured, to thereby provide high filtration performance. The cross-sectional pore size index is more preferably 45 or more, and further preferably 50 or more.

Further, the cross-sectional pore size index is preferably 25 or more, and more preferably 27 or more, in a normalized region divided into 10 portions in the membrane thickness direction where the membrane position ranges from 0 to 0.1.

Still further, the cross-sectional pore size index is preferably 70 or more, more preferably 80 or more, further preferably 85 or more, and particularly preferably 90 or more, in a normalized region divided into 10 portions in the membrane thickness direction where the membrane position ranges from 0.2 to 0.3.

The porous membrane of this embodiment may be formed of a single layer or a multi-layer construction including two or more layers.

Figure 2:
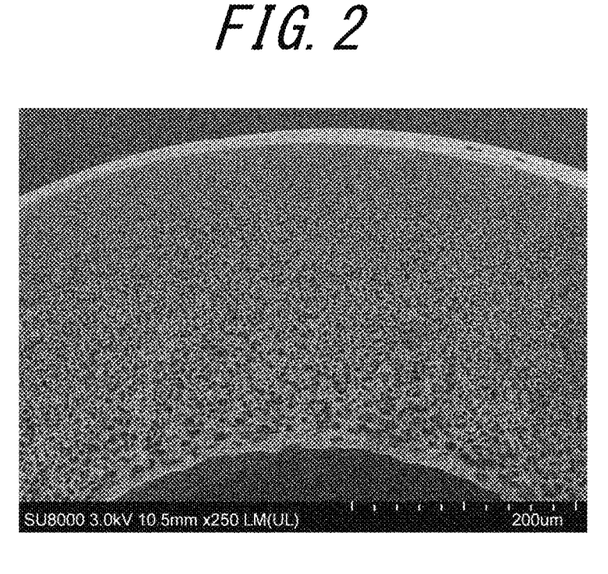
FIG. 2 is an electron micrograph (250×) of a cross section of the porous membrane of Example 1.

The multi-layer construction in this embodiment refers to a porous membrane having a cross section where boundaries between the layers can be identified when observed with an electron microscope. The porous membrane of this embodiment is formed of a single layer because no boundary exists between the layers as illustrated in FIG. 2.

Next described is a manufacturing method of the porous membrane of the aforementioned embodiment.

The porous membrane of the aforementioned embodiment is manufactured by a so-called wet membrane manufacturing method or a so-called dry membrane manufacturing method. In the wet membrane manufacturing method, a membrane forming stock solution (spinning solution) at least containing: a hydrophobic polymer component, a hydrophilic polymer component, which include, as main components, a vinylidene fluoride-based resin, a hexafluoropropylene-based resin, or a polysulfone-based resin; and a common solvent shared by the hydrophobic and hydrophilic polymer components is extruded from a molding nozzle so as to be solidified in a solution containing water as a main component. In the dry membrane forming method, a predetermined idle running distance is ensured for the spinning solution extruded from the molding nozzle. Here, the hydrophobic polymer as disclosed herein is defined as a polymer having a critical surface tension ($\gamma c$) of 50 (mN/m) or more at 20° C.; and the hydrophobic polymer as disclosed herein is defined as a polymer having a critical surface tension ($\gamma c$) of less than 50 (mN/m) at 20° C.

Further, as necessary, the membrane forming stock solution may include a nonsolvent to hydrophobic polymer.

In the manufacturing method of this embodiment, first, a hydrophobic polymer component for manufacturing a porous membrane including, as a main component, a vinylidene fluoride-based resin and a hydrophilic polymer component as a hydrophilization component is dissolved into a common solvent of these hydrophobic and hydrophilic polymer components, to thereby prepare a porous membrane forming stock solution.

The hydrophobic polymer component for forming the porous membrane may be a vinylidene fluoride-based resin with single molecular weight, or may be a mixture of a plurality of vinylidene fluoride-based resins with different molecular weights. Further, in order to improve the nature of the porous membrane, the hydrophobic polymer component may be mixed with one or more kind of other polymers, without being limited to a hydrophobic polymer.

In mixing other polymers, the other polymers are not particularly limited as long as the polymers are compatible with the vinylidene fluoride-based resin. For example, a hydrophilic polymer may be used to impart hydrophilicity to the membrane, and a hydrophobic polymer, preferably, a fluoride-based polymer may be used to further increase the hydrophobicity of the hydrophobic membrane. In mixing other polymers, a vinylidene fluoride-based resin may preferably be contained by 80 mass % or more, preferably by 90 mass % or more in terms of the solid content of the entire polymer component.

The manufacturing method according to this embodiment may preferably use polyethylene glycol (also referred to as polyethylene oxide) having a weight average molecular weight (MW) of 20,000 or more and 150,000 or less, as a hydrophilic polymer component to be blended into a membrane forming stock solution as a hydrophilic component. A porous membrane can still be formed with polyethylene glycol having a weight average molecular weight of less than 20,000; however, a porous membrane satisfying the disclosed pore size may be difficult to form. When the weight average molecular weight exceeds 150,000, polyethylene glycol may be difficult to uniformly dissolve in a spinning solution with a vinylidene fluoride-based resin as a main component of a hydrophobic polymer component forming a porous membrane. In view of obtaining a spinning solution excellent in membrane-forming property, polyethylene glycol may preferably have an weight average molecular weight of 20,000 or more and 120,000 or less. Here, in view of obtaining a spinning solution excellent in membrane-forming property as well as keeping balance between crystallinity and specific surface area, the content of polyethylene glycol in a hydrophilic polymer component is preferably 80 mass % or more, more preferably 90 mass % or more, and further preferably 95 mass % or more in terms of the solid content of the hydrophilic polymer component.

As in the aforementioned embodiment, the disclosed manufacturing method preferably uses polyethylene glycol as a hydrophilic polymer component. However, without being limited to polyethylene glycol, polyvinylpyrrolidone or partially saponified polyvinyl alcohol may also be used. Alternatively, two or more kinds of hydrophilic polymer components may be mixed.

As the hydrophilic polymer component to meet the aforementioned requirement, a hydrophilic polymer component available as an industrial product may be used alone or in combination of several kinds thereof. Further, the hydrophilic polymer component may be generated by chemically or physically treating a raw material with a larger weight average molecular weight so as to have a suitable weight average molecular weight.

Examples of the nonsolvent to hydrophobic polymer include water and alcohol compounds, with glycerin being preferred in view of ease of preparing the membrane forming stock solution, formation and distribution of hydrophilic polymer, being less susceptible to composition changes during storage, and ease of handling.

The aforementioned hydrophilic polymer preferably has a moisture content of 3.0 mass % or less. With the moisture content being 3.0 mass % or less, the outer surface pore size may have a variation coefficient of 50 mass % or less. The moisture content is preferably 2.5 mass % or less, and more preferably 2.0 mass % or less, because hydrophilic polymer forming a dilute phase in the phase separation should contain less moisture to reduce fluctuations in phase separation time to make smaller the pore size variation coefficient. This even leads to an increase in virus-blocking performance, because a narrower pore size distribution can suppress reduction in blocking performance in a portion with a larger pore size, to thereby achieve the aforementioned virus-blocking performance. The moisture content may be measured by an infrared aquameter or Karl Fischer method.

The vinylidene fluoride-based resin for use in the aforementioned membrane forming stock solution may preferably include heterogeneous sequences at a certain ratio, in order to obtain a membrane with excellent chemical resistance. For example, in the case of using a polyvinylidene difluoride (PVDF) resin, the heterogeneous sequence ratio in the molecule may preferably be 8.0% or more and less than 30.0% in $^{19}$F-NMR measurements.

The heterogeneous sequence ratio in PVDF resin may be measured as follows. Using Lambda400 of JEOL Ltd. as an NMR measurement apparatus, the porous membrane is subjected to $^{19}$F-NMR measurement using $d_6$-DMF as a solvent and $CFCL_3$ as the internal standard (0 ppm). The heterogeneous sequence content is calculated from the following equation (1), based on an integrated value (Ir) of signals derived from a normal sequence appearing in the vicinity of −92 ppm to −97 ppm and an integrated value (Ii) of signals derived from a heterogeneous sequence appearing in the vicinity of −114 ppm to −117 ppm in the resulting spectrum.

$$\text{Heterogeneous Sequence Ratio (\%)} = \{Ii/(Ir+Ii)\} \times 100 \quad (1)$$

Further, the mixture ratios of the hydrophobic polymer component and the hydrophilic polymer component in the aforementioned membrane forming stock solution may preferably be, without particularly limited, 20 mass % or more and 40 mass % or less for the hydrophobic polymer component and 8 mass % or more and 30 mass % or less for the hydrophilic polymer component, with the remainder being a solvent, and further preferably be 23 mass % or more and 35 mass % or less for the hydrophobic polymer component and 10 mass % or more and 25 mass % or less for the hydrophilic polymer component, with the remainder being a solvent. The membrane forming stock solution with the mixture ratios falling within the aforementioned ranges may be used to form a porous film, so as to readily adjust the residue of the hydrophilic polymer component to a predetermined amount, which also allows for readily obtaining a porous membrane with high strength as well as excellent chemical strength and water permeability.

Further, in the aforementioned method, a solution mainly containing water to solidify the membrane forming stock solution during film formation has a solution temperature (Tb° C.) that may preferably satisfy the relation of Td≤Td+50 relative to the temperature of the film forming solution (Td° C.), while the turbidity point temperature (Tc° C.) of the membrane forming liquid preferably satisfies Tc≤Tb. A film formed under the aforementioned conditions satisfying the relation of such temperature ranges will have high water permeability. In addition, the solidified liquid will have increased diffusion rate, which allows the solidification to be completed in a state where the hydrophilic polymer component is at least partially embedded in the skeleton of the porous media, so that the residue of the hydrophilic polymer component may be adjusted in a desired range.

In the case of manufacturing hollow fiber porous membranes with the aforementioned manufacturing method, a double-tube nozzle may preferably be used as a molding nozzle during manufacture so as to extrude the membrane forming stock solution from the double-tube nozzle together with a hollow forming agent, so that the extruded solution may be solidified in a solution bath retaining the aforementioned solution. This configuration allows for readily manufacturing a porous membrane with a hollow fiber membrane structure. The double-tube molding nozzle and the hollow forming agent as used herein may use any kind commonly used in the field of art, without being particularly limited. Here, a porous membrane having a hollow fiber membrane structure may also herein referred to as porous hollow fiber membrane.

Figure 1:
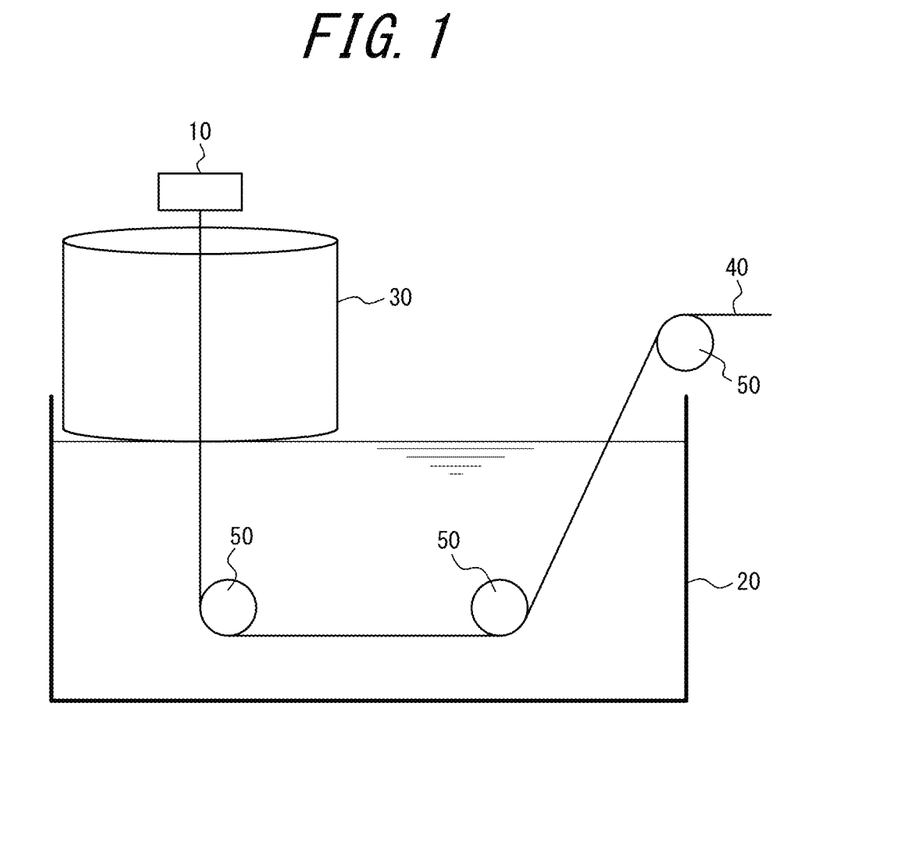
FIG. 1 is an example of a manufacturing system for manufacturing hollow fiber porous membranes.

FIG. 1 illustrates an exemplary manufacturing system for manufacturing the aforementioned porous hollow fiber membrane. The manufacturing system of the porous hollow fiber membrane includes: a double-tube molding nozzle 10; a solution bath 20 retaining a solution to solidify the membrane forming stock solution; a container 30 covering a free running zone where the membrane forming stock solution discharged from the molding nozzle 10 passes through before reaching the solution in the solution bath; and a plurality of rollers 50 to convey and wind thereon the porous hollow fiber membrane.

The membrane forming stock solution extruded from the double-tube molding nozzle 10 is caused to pass through the solution bath 20 via the free running zone. The membrane forming stock solution may desirably take 0.2 to 10 seconds to pass through the free running zone. In order to form a hollow portion, a hollow forming agent is caused to flow through an inner most annular ring of the double-tube molding nozzle 10. The hollow forming agent may be prepared as an aqueous solution obtained by mixing a common solvent shared by the film forming stock solutions with water in a mass ratio of 25 to 95 of the common solvent (here, the mass ratio refers to mass % of the common solvent to the aqueous solution). The use of the aqueous solution thus mixed allows for controlling the pore size on the inner surface side of the porous hollow fiber membrane. Here, when the mass ratio is 25 or more, the pore size on the inner surface (surface with a larger pore size) can be made three times larger than the pore size on the outer surface side (surface with a smaller pore size), which can render high water permeability. When the mass ratio is larger than 95, the solidification occurs too slowly on the inner surface side, which extremely deteriorates fiber forming stability.

The membrane forming stock solution is retained in the solution bath (in the solution) desirably for 5.0 seconds or more. When the membrane forming stock solution is retained in the solution bath for 5.0 seconds or more, enough time is ensured to allow the common solvent of the membrane forming stock solutions, which is present from the center of the membrane thickness to the inner surface, to be diffused and exchanged with a nonsolvent in the solution bath. As a result, solidification is accelerated so as to stop phase separation in a suitable state, enhancing the communication property of the cross-sectional membrane structure. Further, when the solution is retained for a long time extends time for the porous membrane to contract near the outer surface in the cross section thereof, which leads to the formation of a porous membrane having pores in a pore size of 2.0 μm or more at positions ranging from 0.6 to 0.9 within the membrane thickness normalized by defining one surface position as 0 and the other surface position as 1 of the porous membrane.

The retention time is further desirably 5.0 seconds or more and 50 seconds or less. The process can be shortened and simplified with the retention time of 50 seconds or less. The retention time is more desirably 6.0 seconds or more and 45 seconds or less. The solution bath may include one stage or a plurality of stages of two or more, depending on the purpose. When the solution bath includes a plurality of stages, the respective retention times in each stage may be totaled to fall within the aforementioned range.

The temperature of the solution bath, which is not particularly limited as long as the aforementioned relation is satisfied, may preferably 45° C. or more and 95° C. or less, and further preferably 50° C. or more and 90° C. or less. When a plurality of solution baths are provided, the respective solution baths may have different temperature conditions.

The aforementioned free running zone may be provided with a container to control temperature and humidity of the free running zone. The container, which is not particularly limited in shape, may be formed, for example, in a prism shape or in a circular shape, or may be hermetically sealed or may not be sealed.

The free running zone may preferably be in a temperature environment condition of 3° C. or more and 90° C. or less. Stable temperature control may be conducted within this range, so as to maintain fiber formability. The temperature may desirably be in a range of 5° C. or more and 85° C. or less. The relative humidity is in a range of 20 to 100%.

The common solvent for use in the membrane forming stock solution is not particularly limited as long as the aforementioned hydrophobic and hydrophilic polymer components can be dissolved thereinto, and publicly known solvents may be selected as appropriate for use. In view of improving stability of the membrane forming stock solution, at least one solvent selected from a group consisting of: N-methylpyrrolidone (NMP); dimethylformamide (DMF); dimethylacetamide (DMAc); and dimethylsulfoxide (DMSO) may preferably be used. Alternatively, a mixture solvent of at least one common solvent selected from the aforementioned group and other solvents may also be used. In this case, the mixture solvent for use may preferably contain 80 mass % or more, more preferably 90 mass % or more of the total amount of the common solvent(s) selected from the aforementioned group, with respect to the total amount of the mixture solvent.

In the manufacturing method of the porous membrane of this embodiment, the film forming stock solution may preferably have a solution viscosity of 5 Pa·s or more and 100 Pa·s or less, more preferably 10 Pa·s or more and 90 Pa·s or less at a temperature for allowing the liquid to flow out of the double-tube molding nozzle 10. The solution viscosity of 5 Pa·s allows the membrane forming stock solution to have long-time free running without dripping off by its own weight after flowing out of the double-tube molding nozzle 10 in fabricating a porous hollow fiber membrane. The solution viscosity of 100 Pa·s allows for stably extruding a constant flow out of the double-tube molding nozzle 10, which can suppress variation in membrane performance, and also increase the cross-sectional pore size due to increased rate of phase separation.

The ratio of the outermost diameter of the discharge port of the molding nozzle 10 to the outer diameter of the porous hollow fiber membrane, which is defined as a drawing ratio (=the outermost diameter of the discharge port/the outer diameter of the porous hollow fiber membrane), is preferably 1.10 or more, more preferably 1.15 or more and 3.00 or less, and further preferably 1.15 or more and 2.50 or less.

The phase separation rate is fast in the membrane forming stock solution having a viscosity falling within the aforementioned range. Thus, void is likely to form in the cross-section of the porous hollow fiber membrane, in particular, in the vicinity of the cross-sectional outer surface. However, the drawing ratio of 1.10 or more can suppress void formation, to thereby obtain a three-dimensional network structure. Further, the drawing effect changes the shape of pores located at a position of 0.1 within the normalized membrane thickness, to thereby allow for manufacturing a porous hollow fiber membrane in which the cross-sectional pore size index has a sharp gradient of 25 or more.

The membrane thus manufactured may also be heat treated as necessary. The heat treatment temperature may preferably be 45° C. or higher and 100° C. or lower, and more preferably 50° C. or higher and 95° C. or lower. Within this temperature range, the membrane contraction can suppress the variation coefficient of the outer diameter, and the heat treatment can be performed without significantly reducing the water permeability.

These manufacturing method allows for readily and stably manufacturing a porous hollow fiber membrane having high blocking performance, being excellent in water permeability and strength, and capable of stably performing filtering operation over a long period of time, which could not have been attained by a conventional porous membrane.

EXAMPLES

Hereinafter, the disclosed porous membrane is more specifically described with reference to Examples and Comparative Examples, which is however in no way limited to such Examples.

Here, porous hollow fiber membranes (hereinafter, also simply referred to as hollow fiber membranes) formed of the disclosed porous membranes of Examples and porous membranes of Comparative Examples were manufactured and evaluated.

The following measurement method was used in Examples. The following measurements were all performed at 25° C. unless otherwise specified.

In below, the evaluation method is explained first, and then the manufacturing method of and evaluation results for Examples and Comparative Examples are explained.

[1] Measurement of Outer Diameter and Inner Diameter (mm)

A hollow fiber membrane is sliced with a razor in the direction perpendicular to the membrane longitudinal direction, and measured with a microscope for the major and minor axes of the inner diameter and the major and minor axes of the outer diameter, so as to determine the inner diameter by the following expression (2) and the outer diameter by the following expression (3). The membrane thickness D (mm) is expressed by the expression (4).

Inner Diameter [mm]

$$=(\text{Inner Major Axis [mm]} + \text{Inner Minor Axis [mm]})/2 \quad (2)$$

Outer Diameter [mm]

$$=(\text{Outer Major Axis [mm]} + \text{Outer Minor Axis [mm]})/2 \quad (3)$$

$$\text{Membrane Thickness [mm]} = (\text{Outer Diameter [mm]} - \text{Inner Diameter [mm]})/2 \quad (4)$$

[2] Pure Water Permeability (L/m²/Hr)

A wet hollow fiber membrane of approximately 10 cm in length was sealed at one end. An injection needle is inserted into a hollow portion at the other end to inject pure water of 25° C. into the hollow portion at a pressure of 0.1 MPa. Then, the amount of pure water transmitted to the outer surface is measured to determine the pure water permeability F by the following expression (5), in which the membrane effective length refers to a net length of the membrane excluding the portion where the injection needle is inserted.

Pure Water Permeability [$L/m2/hr$]=60 [min./hr.]×
Transmitted Water Amount [$L$]/π×Membrane
Inner Diameter [$m$]×Membrane Effective
Length [$m$]×Measurement Time [min.]         (5)

Here, the permeability coefficient P is calculated from the membrane thickness D and the pure water permeability F measured as described above, based on the relation of: P[$L/m^2/hr/mm$]=F/D.

[3] Compression Resistive Strength (MPa)

A wet hollow fiber membrane of approximately 5 cm in length was sealed at one end and opened to the atmosphere at the other end. Pure water of 40° C. was pressurized from the outer surface to expel the permeate from the atmosphere-opening end. At this time, so-called dead end filtration was adopted, where the membrane supply water was all filtered without being circulated. The pressurizing pressure is boosted by 0.01 MPa increments from 0.1 MPa, and the pressure was held for 15 seconds at each stage, during which the permeate from the atmosphere-opening end was sampled for 15 seconds. An absolute value of the transmitted water amount (mass) increases along with the increase of applied pressure as long as the hollow portion of the hollow fiber is retained without being crushed. However, once the applied pressure exceeds the compression resistive strength of the hollow fiber membrane, the hollow portion crushes and clogging starts, which reduces the absolute value of the transmitted water amount despite the increase of the applied pressure. The applied pressure which maximizes the absolute value of the transmitted water amount is defined as compression resistive strength.

[4] Average Value (m) of Inner/Outer Surface Pore Sizes and Variation Coefficient (%) of the Outer Surface Pore Size A picture with a magnification that allows observation of 100 or more pore shapes with a scanning electron microscope was used to measure inner/outer surface pore sizes of a porous hollow fiber membrane.

The inner/outer surface pore sizes were each measured on the respective surfaces as described in below. In each surface, the longest one of line segments connecting two points on the outer circumference of the pore was defined as a major axis. The longest one of line segments perpendicularly intersecting with the major axis while connecting two points on the outer circumference of the pore was defined as a minor axis. Here, when an arbitrary line segment was drawn across the outer circumference of each pore, the pore intersecting with the line segment at three or more points on the outer circumference of the pore was excluded from the measurement subjects. When a pore formed on the outer surface is observed, there may be found another pore formed at the bottom of the observed pore. Such pore(s) to be found at the bottom of the pore does not correspond to "the pore on the surface", and thus was not subjected to measurement. The pore diameter on the inner surface was similarly measured. The major axis and the minor axis thus measured were used to obtain an average value of the (major axes) and the (minor axes) of 100 pore extracted, and as an arithmetic mean of the pore sizes of the 100 pores was defined as an average value of the pore size on each surface. In Examples and Comparative Examples, 100 pores were sequentially measured from the vicinity of the center of the image. All the pore sizes in one image were measured; when the image includes less than 100 pores, another image capturing another position was used, which was similarly measured.

Further, the inner surface pore size/outer surface pore size ratio is a ratio between an average value of the outer surface pore sizes and an average value of the inner surface pore sizes which were obtained as described above.

The pore size variation coefficient was calculated from data on 100 pores obtained through pore size measurement.

[5] Cross-Sectional Pore Size (μm)

To calculate the cross-sectional pore size, the membrane thickness was normalized by defining one surface position as 0 and the other surface position as 1 and divided into ten regions in the membrane direction, and the pore sizes in a region of 0 to 0.1, a region of 0.1 to 0.2, . . . , a region of 0.9 to 1.0 of the 10 regions were measured and analyzed for the profile of the cross-sectional pore size.

First, an image was obtained by capturing, with a scanning electron microscope, pores on the cross section of the membrane divided into 10, at a magnification that allows each shape of the 100 or more pores to be confirmed. Then, as described in WO01/53213 (PTL 2) a transparent sheet was overlaid on a copy of the electron microscope image and pore portions of the pores were blotted in black. Thereafter, the transparent sheet was copied on a white paper so as to clearly distinguish pore portions as black from non-pore portions as white. When the outer circumference of a pore intersects with any of the borders dividing the cross section, the pore was not regarded as the measurement subject.

Using a commercially-available image analysis software Winroof6.1.3, the image was binarized by a discriminant analysis method, so as to obtain the sum total of the areas of the pore portions. Further, each pore was calculated for equivalent circle diameter, and the equivalent circle diameters were arranged in the descending order. The pore areas were sequentially added in order from the largest pore, and when the sum total of the areas corresponds to ½ of the areas of all the pores, the equivalent circle diameter of the pore was defined as the cross-sectional pore size.

Of the pore sizes calculated for a region of 0.6 to 0.7, a region of 0.7 to 0.8, and a region of 0.8 to 0.9, the maximum pore size was defied as a cross-sectional pore size at a membrane thickness position in a region of 0.6 to 0.9.

Further, the cross-sectional pore sizes in a region of 0 to 0.1, a region of 0.1 to 0.2, and a region of 0.2 to 0.3 were each divided by the outer surface pore sizes to calculate a cross-sectional pore size index.

[6] Virus-Blocking Performance

Bacteriophage MS-2 NBRC13965 (approximately 25 nm in particle size) was used as a test virus, which was grown in *Escherichia coli* on the order of $10^7$ pfu/mL and buffered by 0.1 mM phosphate buffer to prepare a test stock solution with pH7. Then, the following non-destructive test was performed to evaluate the virus-blocking performance of the porous hollow fiber membrane.

The moist porous hollow fiber membrane was cut into an effective length of about 12 cm. The porous hollow fiber membrane was fixed in a cylindrical case, so that one end of the porous hollow fiber membrane can be sealed and the other end thereof can be opened. A liquid feeding port was provided inside the case, and 1000 mL Phage solution was forcibly sent from the feeding port under a pressure of 20 kPa being applied, so as to filter the Phage solution through the porous hollow fiber membrane from outside toward the inside. Then, the filtrate was taken out from the opened end of the porous hollow fiber membrane, and 20 mL of the final flow thereof was sampled. The test stock solution, and in the sampled filtrate, and Bacteriophage MS-2 were each quantitatively measured, so as to calculate the Bacteriophage MS-2 blocking performance (removing performance) based on the following equation (6):

Removing Performance (LRV)=−log 10{1−(MS2 in
    Test Stock Solution−MS2 in Filtrate)/MS2 in
    Test Stock Solution}         (6)

[7] Measurement of Moisture Content in Hydrophilic Polymer

The moisture content was measured by an infrared aquameter.

A PVDF resin was used as the hydrophobic polymer component in the following measurement method.

[8] Measurement of Polyethylene Glycol Content with Respect to 100 Mass % of PVDF Resin in Porous Membrane (PEG Residual Amount in Membrane)

Using Lambda400 of JEOL Ltd. as an NMR measurement apparatus, the porous membrane was subjected to $^{19}$F-NMR measurement using $d_6$-DMF as a solvent and tetramethylsilane as the internal standard (0 ppm). The polyethylene glycol content was calculated from the following equation, based on an integrated value (IPEG) of signals derived from polyethylene glycol appearing near 3.6 ppm and an integrated value (IPVDF) of signals derived from a PVDF resin appearing near 2.3 to 2.4 ppm and 2.9 to 3.2 ppm in the resulting spectrum.

Polyethylene Glycol Content (mass %)={44(IPEG/4)/60(IPVDF/2)}×100

[9] Measurement of Weight Average Molecule of Polyethylene Glycol in Porous Membrane 0.1 g of porous membrane was dissolved in 10 mL acetone, and the resulting solution was dropped into 100 mL water. Polymers forming a membrane were reprecipitated and polyethylene glycol remaining in the membrane was separated as an aqueous solution. Thereafter, a solution including polyethylene glycol was concentrated by an evaporator, and the dissolved by a moving phase liquid described in below, so as to obtain a polyethylene glycol solution. Using 200 mL of the solution thus obtained, GPC was measured under the following conditions, to thereby obtain the weight average molecular weight (polyethylene glycol standard sample equivalent).

Apparatus: HLC-8220GPC (TOSOH CORPORATION)
Column: Shodex SB-803HQ
Moving Phase: 0.7 mL/min $KH_2PO_4$ (0.02 mM)+ $Na_2HPO_4$ (0.02 mM) aqueous solution
Detector: Refractive Index Detector

[10] Solution Viscosity Measurement of Membrane Forming Stock Solution

The membrane forming stock solution put in a widemouth bottle was placed in a thermostat bath to control the liquid temperature such that the liquid is extruded from the double-tube nozzle. Brookfield type viscometer was used to measure the viscosity.

[11] Water Permeability Performance Test

Figure 4:
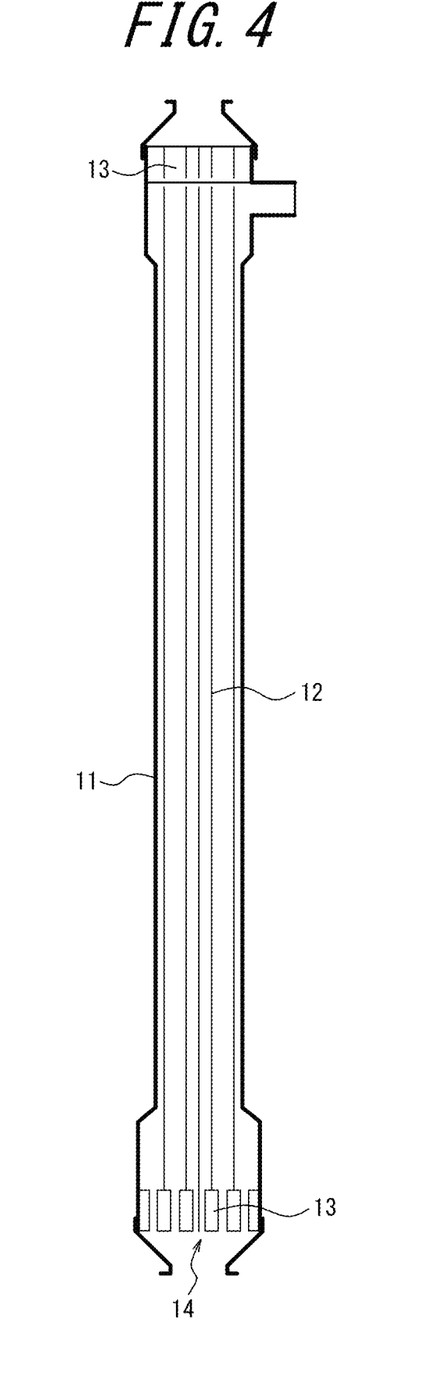
FIG. 4 is a filtration module used in a water permeability performance test.

A hollow fiber membrane 12 was used to prepare a filter module 11 as illustrated in FIG. 4. The filter module 11 has an effective membrane length of 1 m, and is formed of 300 hollow fibers, with the hollow fibers at both ends being sealed with an epoxy sealing material 13. The hollow portion of the hollow fiber membrane opens at the upper end of the module, while the hollow portion of the hollow fiber membrane is sealed at the lower end of the module. River water with turbidity of 2 to 4 was introduced through an inlet 14 for untreated water and air, so as to be filtered from the outer surface side of the hollow fiber, to thereby obtain filtrate water from the inner surface side at the upper end. Set Flux (set Flux (m/day) is obtained by dividing the filtration flow rate ($m^3$/day) by the extramembrane surface area ($m^2$)) was incremented stepwise, and the Flux obtained immediately before the transmembrane pressure difference starts to sharply rise was defined as critical Flux (m/day). The sharp rise of the transmembrane pressure difference was determined using as an index the rising rate of about 50 kPa/5 days.

Next, description is given of how to manufacture Examples and Comparative Examples.

Example 1

25 mass % of PVDF homopolymer (manufactured by Arkema Inc., KYNAR741) as a PVDF resin and 17 mass % of polyethylene glycol with a weight average molecular weight of 35000 (manufactured by Merck.com, polyethylene glycol 35000) were dissolved at 60° C. in 58 mass % dimethylacetamide, so as to be obtained as the membrane forming stock solution. Polyethylene glycol had a moisture content of 0.30 mass %.

The membrane forming stock solution was extruded, together with an aqueous solution of 80 mass % of dimethylacetamide as a hollow forming agent, from a double ring spinning nozzle with a drawing ratio of 1.20. The membrane forming stock solution passes through the free running distance to be solidified in water of 83° C., which was thereafter desolvated in water of 60° C. to obtain a porous hollow fiber membrane. The retention time in water of 83° C. was 27.2 seconds. The porous hollow fiber membrane thus obtained was heat-moisture treated at 60° C.

Table 1 summarizes the properties of the membranes, including those of Examples in below.

Figure 3:
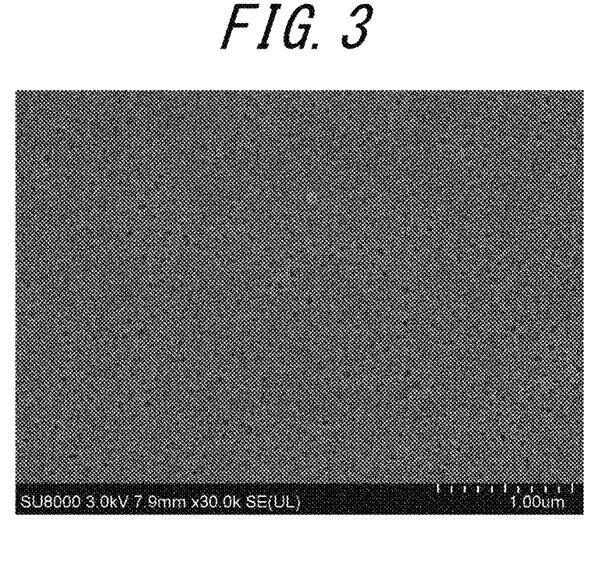
FIG. 3 is an electron micrograph (30000×) of an outer surface of the porous membrane of Example 1.

FIG. 2 is an electron micrograph (250×) of a cross section of the disclosed porous membrane (porous hollow fiber membrane) of this Example 1, and FIG. 3 is an electron micrograph (30000×) of one surface of the porous membrane (an outer surface of the porous hollow fiber membrane) of Example 1.

Example 2

24 mass % of PVDF homopolymer (manufactured by Arkema Inc., KYNAR741) as a PVDF resin and 16 mass % of polyethylene glycol with a weight average molecular weight of 35000 (manufactured by Merck.com, polyethylene glycol 35000) were dissolved at 80° C. in 60 mass % N-methylpyrrolidone, so as to be obtained as the membrane forming stock solution. Polyethylene glycol had a moisture content of 0.30 mass %.

The membrane forming stock solution was extruded, together with an aqueous solution of 80 mass % of N-methylpyrrolidone as a hollow forming agent, from a double ring spinning nozzle with a drawing ratio of 1.20. The membrane forming stock solution passes through the free running distance to be solidified in water of 83° C., which was thereafter desolvated in water of 60° C. to obtain a hollow fiber membrane. The retention time in water of 83° C. was 30.2 seconds. The porous hollow fiber membrane thus obtained was heat-moisture treated at 60° C.

Example 3

The porous hollow fiber membrane was manufactured by the same method as that of Example 2, except in that the drawing ratio was 1.40.

Comparative Example 1

The porous hollow fiber membrane was manufactured by the same method as that of Example 1, except in that the drawing ratio was 1.05.

Comparative Example 2

The porous hollow fiber membrane was manufactured by the same method as that of Example 2, except in that the drawing ratio was 1.05.

Comparative Examples 1 and 2 with the drawing ratio of less than 1.10 were small in cross-sectional pore size index, and had low filtering performance.

In either Example and Comparative Example, the porous membrane was formed of a single layer.

TABLE 1

|  |  | Example 1 | Example 2 | Example 3 | Comp. Example 1 | Comp. Example 2 |
|---|---|---|---|---|---|---|
| hydrophobic polymer | — | PVDF | PVDF | PVDF | PVDF | PVDF |
| common solvent | — | DMAc | NMP | NMP | DMAc | NMP |
| hydrophilic polymer | — | PEG | PEG | PEG | PEG | PEG |
| weight-average molecular weight in hydrophilic polymer | Mw | 35000 | 35000 | 35000 | 35000 | 35000 |
| water content in hydrophilic polymer | mass % | 0.30 | 0.30 | 0.30 | 0.30 | 0.30 |
| solution viscosity | Pa·sec | 15 | 25 | 25 | 15 | 25 |
| stock solution temperature (Td) | °C. | 60 | 80 | 80 | 60 | 80 |
| hollow forming agent   common solvent | — | DMAc | NMP | NMP | DMAc | NMP |
| concentration | mass % | 80 | 80 | 80 | 80 | 80 |
| drawing ratio | — | — | 1.20 | 1.20 | 1.40 | 1.05 | 1.05 |
| free-running portion   container | — | provided | provided | provided | provided | provided |
| solution bath temperature (Tb) | °C. | 83 | 83 | 83 | 83 | 83 |
| solution bath detention time | sec | 27.2 | 30.2 | 30.2 | 27.2 | 30.2 |
| membrane outer diameter | mm | 1.3 | 1.3 | 1.3 | 1.3 | 1.3 |
| membrane inner diameter | mm | 0.7 | 0.7 | 0.7 | 0.7 | 0.7 |
| membrane thickness | mm | 0.3 | 0.3 | 0.3 | 0.3 | 0.3 |
| pure water permeability | L/m²/hr | 9430 | 9610 | 9880 | 8820 | 8630 |
| water permeability coefficient | L/m²/hr/mm | 31433 | 32033 | 32933 | 29400 | 28767 |
| MS2 removal rate | LRV | 2.0 | 2.0 | 2.0 | 2.0 | 2.0 |
| compression resistance strength | MPa | 0.58 | 0.58 | 0.58 | 0.58 | 0.58 |
| average value of outer surface pore size | nm | 21.4 | 23.4 | 23.4 | 21.4 | 23.4 |
| coefficient of variation of outer surface pore size | % | 19.8 | 20.3 | 20.3 | 19.8 | 20.3 |
| average value of inner surface pore size | µm | 12.4 | 11.4 | 11.4 | 12.4 | 11.4 |
| inner surface pore size/outer surface pore size | — | 579 | 487 | 487 | 579 | 487 |
| cross-sectional pore size in a region where membrane thickness position ranges from 0.6 to 0.9 | µm | 5.7 | 5.4 | 5.4 | 5.7 | 5.4 |
| cross-sectional pore size in a region where membrane thickness position ranges from 0 to 0.1 | — | 30 | 30 | 40 | 15 | 15 |
| cross-sectional pore size in a region where membrane thickness position ranges from 0.1 to 0.2 | — | 45 | 50 | 60 | 20 | 25 |
| cross-sectional pore size in a region where membrane thickness position ranges from 0.2 to 0.3 | — | 95 | 100 | 110 | 40 | 50 |
| PEG residue in membrane | mass % | 2.8 | 1.6 | 1.6 | 2.8 | 1.6 |
| PEG weight average molecular weight in membrane (Mw) | — | 41000 | 38000 | 39000 | 41000 | 38000 |
| critical Flux | m/day | 3.0 | 3.0 | 3.1 | 2.3 | 2.4 |

REFERENCE SIGNS LIST

10 double-tube molding nozzle
20 solution bath
30 container
40 porous hollow fiber membrane
50 roller

The invention claimed is:

1. A hollow fiber membrane comprising outer and inner surfaces and pores,
   wherein, in a cross section taken in a direction perpendicular to a longitudinal direction of the hollow fiber membrane, a region where a distance from the outer surface in a direction from the outer surface to the inner surface is from 0.1 to 0.2 times of a thickness of the hollow fiber membrane has a cross-sectional pore size index of 40 or more with the cross-sectional pore size index being calculated by dividing a cross-sectional size of the pores in the region by a size of the pores on the outer surface,
   wherein the thickness of the hollow fiber membrane is calculated by dividing a difference between an outer diameter and an inner diameter of the hollow fiber membrane by 2, and
   the cross-sectional size of the pores is calculated by determining equivalent circle diameters of the pores, arranging the equivalent circle diameters in a descending order, sequentially adding the pore areas in order from the largest pore, and determining the equivalent circle diameter of the pore as the cross-sectional size of the pores when the sum total of the areas reaches ½ of the areas of all pores.

2. The hollow fiber membrane according to claim 1, wherein the hollow fiber membrane has the cross-sectional pore size index of 25 or more in a region where a distance from the outer surface in the direction from the outer surface to the inner surface is from 0 to 0.1 times of the thickness of the hollow fiber membrane.

3. The hollow fiber membrane according to claim 1, wherein the hollow fiber membrane has the cross-sectional pore size index of 70 or more in a region where a distance from the outer surface in the direction from the outer surface to the inner surface is from 0.2 to 0.3 times of the thickness of the hollow fiber membrane.

4. The hollow fiber membrane according to claim 1, wherein the hollow fiber membrane is formed of a single layer.

5. The hollow fiber membrane according to claim 1, wherein the outer surface has an average pore size of 50 nm or less.

6. The hollow fiber membrane according to claim 1, wherein the hollow fiber membrane has a compression resistive strength of 0.40 MPa or more.

7. The hollow fiber membrane according to claim 1, wherein an average pore size of the inner surface is in the ratio of 50 or more with respect to an average pore size of the outer surface.

8. The hollow fiber membrane according to claim 1, wherein, in the cross section of the hollow fiber membrane, a region where a distance from the outer surface in the direction from the outer surface to the inner surface is from 0.6 to 0.9 times of the thickness of the hollow fiber membrane has the cross-sectional size of pores of 2.0 μm or more.

9. The hollow fiber membrane according to claim 1, wherein the hollow fiber membrane has a pure water permeability of 4000 LMH or more.

10. The hollow fiber membrane according to claim 1, wherein the hollow fiber membrane includes a vinylidene fluoride-based resin as a main component.

* * * * *